United States Patent
Tollner

(10) Patent No.: US 7,814,922 B2
(45) Date of Patent: Oct. 19, 2010

(54) APPARATUS FOR CONTROLLING THE PRESSURE IN A PROCESS CHAMBER AND METHOD OF OPERATING SAME

(75) Inventor: Martin Ernst Tollner, Eastbourne (GB)

(73) Assignee: Edwards Limited, Crawley, West Sussex (GB)

( * ) Notice: Subject to any disclaimer, the term of this patent is extended or adjusted under 35 U.S.C. 154(b) by 1026 days.

(21) Appl. No.: 10/503,280

(22) PCT Filed: Jun. 20, 2003

(86) PCT No.: PCT/GB03/02690

§ 371 (c)(1),
(2), (4) Date: Apr. 22, 2005

(87) PCT Pub. No.: WO04/001230

PCT Pub. Date: Dec. 31, 2003

(65) Prior Publication Data

US 2005/0217732 A1      Oct. 6, 2005

(30) Foreign Application Priority Data

Jun. 20, 2002   (GB) ................. 0214273.5

(51) Int. Cl.
*F04B 37/14*   (2006.01)
*F04B 37/00*   (2006.01)
*F04B 23/08*   (2006.01)

(52) U.S. Cl. ............... 137/12; 137/14; 137/565.23; 137/565.3; 417/28; 417/53; 417/201; 417/205

(58) Field of Classification Search ........... 137/14, 137/565.23, 565.3, 12; 417/53, 201, 205, 417/26, 28

See application file for complete search history.

(56) References Cited

U.S. PATENT DOCUMENTS 2,935,242 A * 5/1960 Lorenz ................ 417/205

(Continued)

FOREIGN PATENT DOCUMENTS

DE      003828608 A1    3/1990

(Continued)

OTHER PUBLICATIONS

Gebrauchanweisung zu der Turbomolekularpumpe TURBO.DRIVE S, der Firma Leybold Vakuum, veröffentlicht, Nov. 2001, p. 21 w/translation.

(Continued)

*Primary Examiner*—John Rivell

(57) ABSTRACT

A method of operating apparatus for controlling the pressure in a process chamber (10), the apparatus comprising a first pump unit (14) having an inlet in fluid connection with an outlet of said process chamber, and a second pump unit (16) having an inlet in fluid connection with an outlet of the first pump unit via a flow control unit (18) comprising a variable flow control device (20; 28) having variable conductance for controlling outlet fluid pressure at the outlet of the first pump unit, the method comprises controlling speed of the first pump unit to increase the range of chamber pressures over which control of the outlet fluid pressure produces changes in said chamber pressure without exceeding the thermal limit and/or motor stall limit of the first pump unit.

27 Claims, 9 Drawing Sheets

U.S. PATENT DOCUMENTS

| | | | |
|---|---|---|---|
| 3,537,474 A * | 11/1970 | Rohrer | 137/565.23 |
| 4,699,570 A | 10/1987 | Bohn | |
| 5,039,280 A * | 8/1991 | Saulgeot et al. | 417/205 |
| 5,110,264 A * | 5/1992 | Murry | 417/205 |
| 5,228,838 A * | 7/1993 | Gebele et al. | 417/53 |
| 5,259,735 A * | 11/1993 | Takahashi et al. | 417/203 |
| 5,340,295 A | 8/1994 | Preiato et al. | |
| 5,534,706 A | 7/1996 | Borden et al. | |
| 5,537,857 A * | 7/1996 | Grosse Bley | 73/40.7 |
| 5,611,863 A | 3/1997 | Miyagi | |
| 5,758,680 A * | 6/1998 | Kaveh et al. | 137/14 |
| 5,944,049 A * | 8/1999 | Beyer et al. | 137/14 |
| 6,004,109 A * | 12/1999 | Gebele et al. | 417/205 |
| 6,080,679 A * | 6/2000 | Suzuki | 438/726 |
| 6,382,249 B1 * | 5/2002 | Kawasaki et al. | 137/565.3 |
| 6,446,651 B1 * | 9/2002 | Abbel | 137/565.23 |
| 6,782,907 B2 * | 8/2004 | Kawasaki et al. | 137/565.23 |
| 6,938,638 B2 * | 9/2005 | Kubota et al. | 137/565.23 |
| 7,033,142 B2 * | 4/2006 | Conrad et al. | 417/205 |
| 7,219,692 B2 * | 5/2007 | Bernard et al. | 137/565.23 |
| 2005/0217732 A1 * | 10/2005 | Tollner | 137/565.3 |

FOREIGN PATENT DOCUMENTS

| | | | | |
|---|---|---|---|---|
| DE | 3828608 A1 * | 3/1990 | | 417/205 |
| EP | 0343914 A1 | 11/1989 | | |
| EP | 0996877 B1 | 7/1997 | | |
| JP | 58-124079 A2 | 7/1983 | | |
| WO | 99/09387 A | 2/1999 | | |
| WO | 99/50730 A | 10/1999 | | |

OTHER PUBLICATIONS

Gebrauchanweisung zu der Turbomolekularpumpe TURBOVAC TW 300, TW 300 H, der Firma Leybold Vakuum, veröffentlicht, Mar. 2002, p. 21 w/translation.

Gebrauchanweisung zu der Turbomolekularpumpe TURBOVAC TW 701, der Firma Leybold Vakuum, veröffentlicht, Jun. 2003, p. 13 w/translation.

* cited by examiner

APPARATUS FOR CONTROLLING THE PRESSURE IN A PROCESS CHAMBER AND METHOD OF OPERATING SAME

The present invention relates to apparatus for controlling the pressure in a process chamber and method of operating same.

The pressure in a semiconductor processing chamber may be controlled by varying the rate at which process gases are exhausted from the chamber by a vacuum pumping arrangement. This pumping arrangement may include a first pump unit comprising a turbo molecular pump and a second pump unit comprising a backing pump.

The first pump unit may have an inlet which is in fluid connection with an outlet of the semiconductor processing chamber, the second pump unit having an inlet in fluid connection with the outlet of the first pump unit and an outlet which exhausts to atmosphere.

Different process gases are used in different respective semiconductor processing methods and for each gas, there is a desired relationship between chamber pressure and flow rate through the chamber. Therefore, for each gas, chamber pressure must be accurately controlled during semiconductor processing.

Various arrangements have been proposed for controlling the pressure in the semiconductor process chamber. In one such arrangement, a throttle valve is provided between the outlet of the semiconductor processing chamber and the inlet of the first pump unit. Such throttle valves are relatively large and expensive, and can be the cause of contamination in the chamber resulting in lower yield of semiconductor products. Regular cleaning of the valve is required which is inconvenient since this may require stopping the production process and opening the chamber to clean the system.

It has also been proposed to provide a throttle valve between the first pump unit and the second pump unit. The first pump unit generally comprises a turbo molecular pump and the use of a throttle valve downstream thereof has been thought not to be desirable because the increase in backing pressure of the pump to levels at which control of the valve effects changes in the pressure of the processing chamber has caused the pump to exceed its thermal limit. This causes failure of the pump. Also, it has been found that the throttle valve is effective to control pressure in the chamber only over a relatively narrow operative range between a fully open condition and a fully closed condition of the valve, meaning that precise control over the valve is required. It is desirable to provide a flow control unit, such as a unit comprising a throttle valve, between the first pump unit and the second pump unit without exceeding the thermal limit of the first pump unit and also preferably which is effective over an increased operative range of chamber pressure.

The present invention provides a method of operating apparatus for controlling the pressure in a process chamber, the apparatus comprising a first pump unit having an inlet in fluid connection with an outlet of said process chamber, and a second pump unit having an inlet in fluid connection with an outlet of the first pump unit via a flow control unit comprising a variable flow control device having variable conductance for controlling outlet fluid pressure at the outlet of the first pump unit, the method comprising controlling speed of the first pump unit to increase the range of chamber pressures over which control of the outlet fluid pressure produces changes in said chamber pressure without exceeding the thermal limit and/or motor stall limit of the first pump unit.

The present invention also provides apparatus for controlling the pressure in a process chamber, the apparatus comprising a first pump unit having an inlet for fluid connection with an outlet of said process chamber, a second pump unit the flow control unit having an inlet for fluid connection with an outlet of the first pump unit via a flow control unit the variable flow control device comprising a variable flow control device having variable conductance for controlling fluid pressure at the outlet of the first pump unit, and means for controlling speed of the first pump unit to increase the range of chamber pressures over which control of the variable flow control device produces changes in said chamber pressure without exceeding the thermal limit and/or motor stall limit of the first pump unit.

Other aspects of the invention are defined in the accompanying claims.

In order that the present invention may be well understood, various embodiments thereof, which are given by way of example only will now be described with reference to the accompanying drawings, in which.

Figure 1:
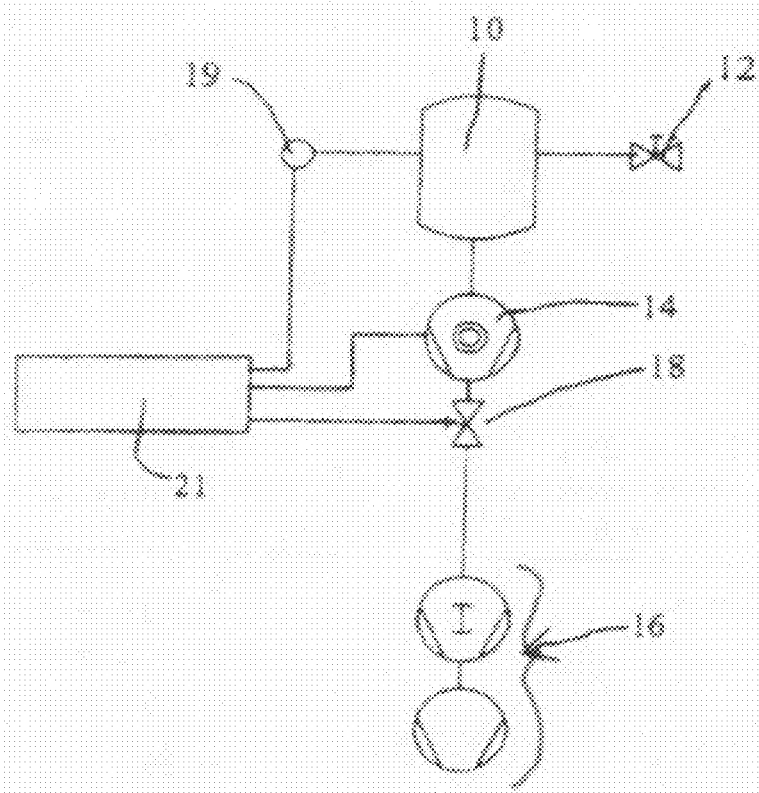
FIG. 1 shows apparatus for controlling the pressure in a processing chamber.

Referring to FIG. 1, a semi-conductor processing chamber 10 has an inlet in fluid connection with an upstream valve 12 for controlling the introduction of processing gases into the processing chamber. There are many different types of gases used in the processing of semiconductor products. These gases may be, for example, nitrogen, argon or chlorine. It will be appreciated that the molecular or atomic configuration of such gases widely vary and impose differing requirements on the pumping arrangement downstream of the chamber 10, as well as requiring different chamber pressures.

As well as semiconductor processing chambers, the pumping arrangement is also applicable for controlling the pressure in other types of processing chambers.

Figure 17:
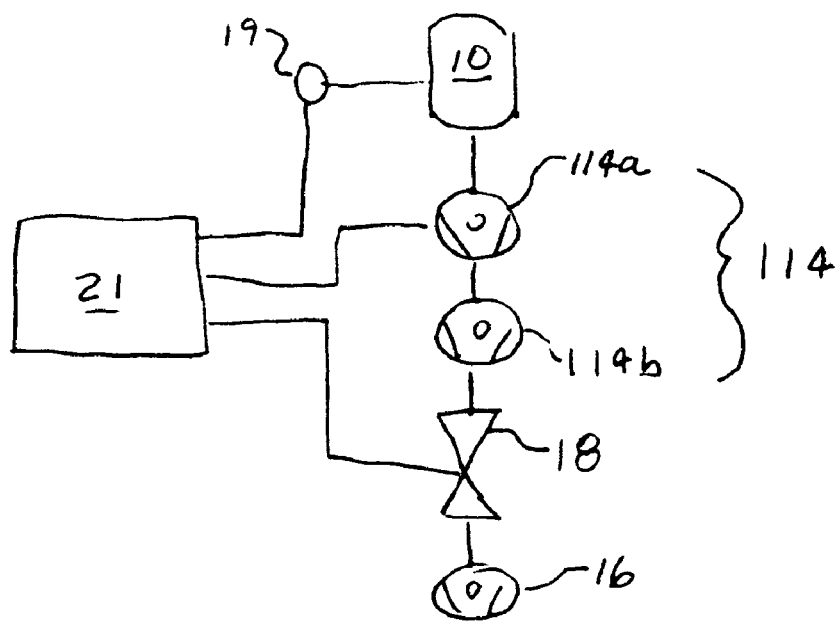
FIG. 17 shows an apparatus for controlling the pressure in a processing chamber.

The chamber 10 has an outlet which is in fluid connection with an inlet of a first pump unit 14, which as shown comprises a turbo molecular pump (TMP) which may comprise turbo molecular, molecular drag, Holweck stage and regenerative stages or combinations thereof. The first pump unit 14 may comprise a unit 114 having two pumps 114a, 114b in series, as shown in FIG. 17. Returning to FIG. 1, gas entering the inlet of the turbo molecular pump is compressed through the various stages of the pump and is drawn off at an outlet of the first pump unit by a second pump unit 16. In FIG. 1, the second pump unit is a backing pump combination which preferably comprises a dry operating vacuum pump employing any known mechanism such as screw, regenerative, diaphragm, scroll or piston type pumps all of which are well known in the vacuum industry. The second pump unit 16 may comprise two pumps in series, as shown. The second pump unit exhausts to atmosphere A flow control unit 18 is provided and controls flow between the outlet of the first pump unit 14 and the inlet of the second pump unit 16. It is desirable to situate flow control unit 18 relatively close, and preferably as close as practical, to the exhaust of the first pumping unit 14 so that chamber pressure responds quickly to control of the flow control unit. Positioning the flow control unit in this way means that control thereof has a relatively quick affect on pump outlet pressure.

A pressure gauge 19 monitors the chamber pressure. The pressure gauge transmits a signal to a control unit 21 which compares it with a desired chamber pressure value and provides a control signal to the flow control unit 18 for controlling flow between the first pump unit 14 and the second pump unit 16. The control unit may be operated manually or automatically.

The speed of the TMP may be selected by an operator, using a speed selector, for each process by using the relationships given below and then this predetermined speed is maintained through inactive control or regulation by a computer or by the operator at the control unit.

$$P_{Inlet} = f(Q, \omega, N)$$

$$T_{TMP} = f(Q, \omega, P_{Exhaust}, P_{Inlet}, k)$$

$$\omega_{Stall} = f(P_{Inlet}, N)$$

ω is such that, $$P_{Inlet} < P_{Required}$$

$$T_{TMP} < T_{Limit}$$

$$\omega < \omega_{Stall}$$

Figure 2:
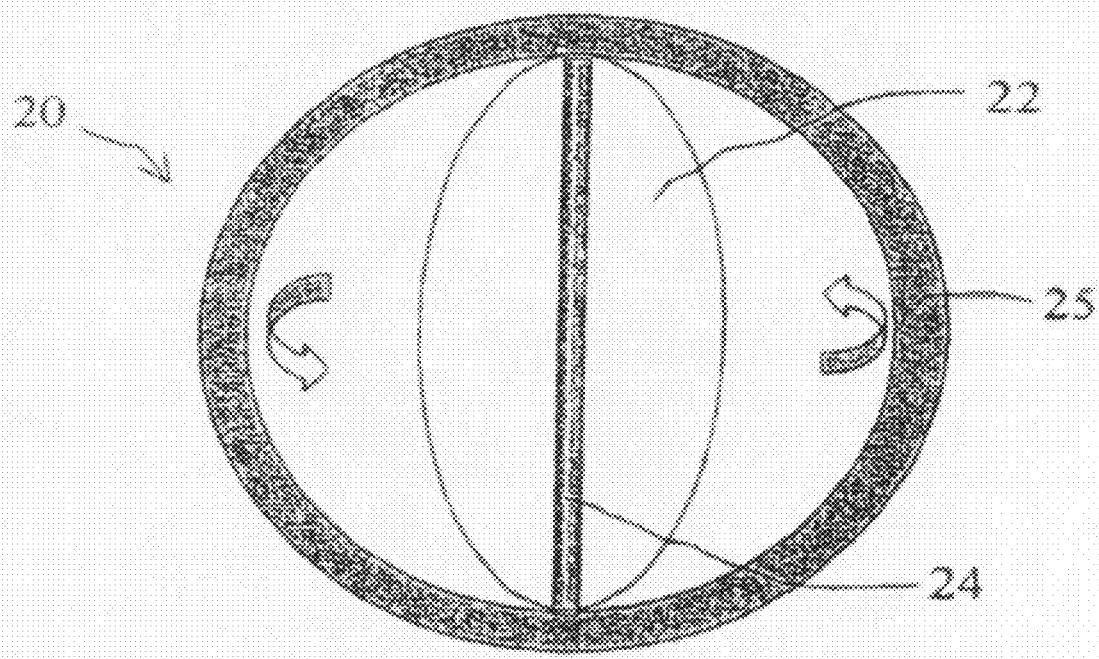
FIG. 2 is a simplified side view of a variable flow control device in a duct between a first pump unit and a second pump unit.

Wherein,
  Q—Mass flow rate of gas
  ω—Rotational speed of TMP
  N—Molecular mass of the gas
  k—Thermal conductivity of the gas
  $P_{Exhaust}$—TMP exhaust pressure
  $P_{Inlet}$—TMP Inlet Pressure
  $P_{Required}$—Required TMP inlet pressure for specific process
  $\omega_{Stall}$—Stall speed of the TMP motor
  $T_{TMP}$—TMP thermal level
  $T_{limit}$—TMP thermal limit FIG. 2 shows a variable flow control device 20 which forms a part of the flow control unit 18. As shown, the flow control device is a butterfly valve disposed in a duct 25 between the first pump unit 14 and the second pump unit 16. Plate 22 is controlled to pivot about axis 24 as shown by the arrows in the Figure. When the valve is closed, plate 22 lies in a plane perpendicular to fluid flow from the first pump unit 14 to the second pump unit 16, thereby providing maximum resistance to flow. When fully closed, the valve is at its lowest conductance. When the plate lies in a plane parallel with the fluid flow and is therefore fully open, there is minimum resistance to flow. When fully open, the valve is at its highest conductance. Closing the valve decreases conductance and therefore increases the outlet fluid pressure at the outlet of the TMP (i.e. backing, or exhaust, pressure). Opening the valve increases conductance and decreases backing pressure.

Figure 3:
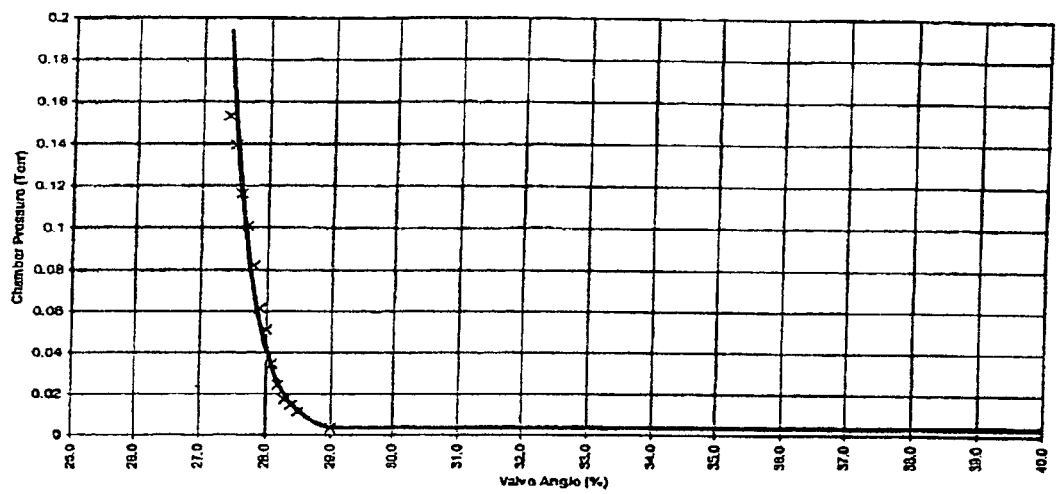
FIG. 3 is a graph of chamber pressure against valve angle of a semiconductor processing system.

For an exemplary mass flow rate of 200 sccm (standard cubic centimetres per minute) for a given process gas flowing through a given turbo molecular pump, the relationship between valve angle of the variable flow control device 20 and chamber pressure is shown in FIG. 3. The valve angle is expressed as a percentage where 100% signifies that the valve is fully open and 0% signifies that the valve is fully closed. Only the portion of the graph between 40% and 25% is shown. Closing the valve from a fully open condition has no effect on chamber pressure until the valve angle reaches about 29% which is the angle at which critical backing pressure of the pump occurs. Above the critical backing pressure, changes in backing pressure effect changes in inlet pressure (ie chamber pressure).

Figure 4:
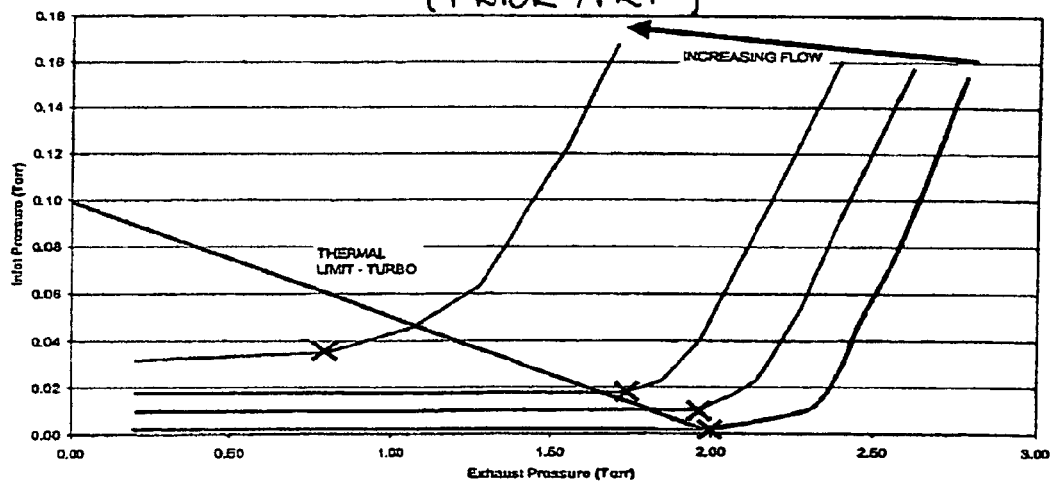
FIG. 4 is a graph illustrating the relationship between inlet pressure and exhaust pressure for a prior art pump unit.

FIG. 4 shows different mass flow rates for an exemplary process gas where the exhaust pressure is plotted against inlet, or chamber, pressure for a TMP operating in normal conditions. In normal conditions, the pump is operated at its maximum sustainable speed to maximise pumping efficiency. It will be seen in FIG. 4 that at exhaust pressures below the critical backing pressure (marked 'X') for each mass flow rate, there is no change in inlet pressure. However, as exhaust pressure is increased, the thermal limit is exceeded. At low flow rates, the thermal limit is exceeded at pressures lower than the respective critical backing pressures. At higher flow rates there is only a relatively small range of exhaust pressures above the critical backing pressure but below the thermal limit of the pump. FIG. 4 demonstrates that in normal conditions, the use of a valve between the TM pump and the backing pump to control pressure in the process chamber is effective only over a relatively small range of exhaust pressures (or not at all) without exceeding the thermal limit of the first pump unit.

Figure 5:
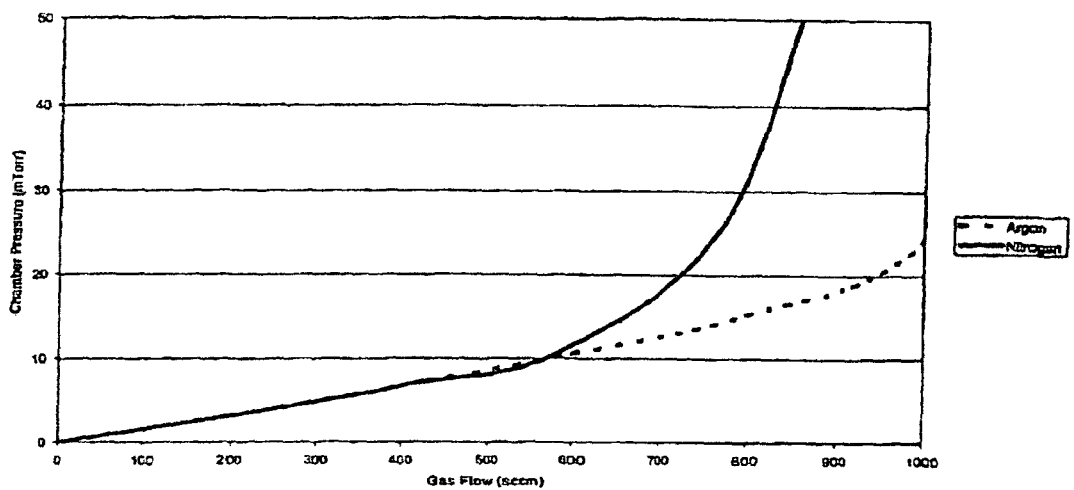
FIG. 5 is a graph of inlet pressure against process gas flow for two process gases.

FIG. 5 shows a graph which plots pump inlet pressure against mass flow rate for two process gases flowing through the chamber in a semiconductor processing method with the pump running at 100%, or full speed. The process gases plotted are $N_2$ and Ar. It will be seen that as flow increases, chamber pressure also increases for that flow rate. For instance, at 150 sccm for Ar, the chamber pressure is about 3 mtorr and at 500 sccm for $N_2$, the pressure is about 8 mtorr.

Figure 6:
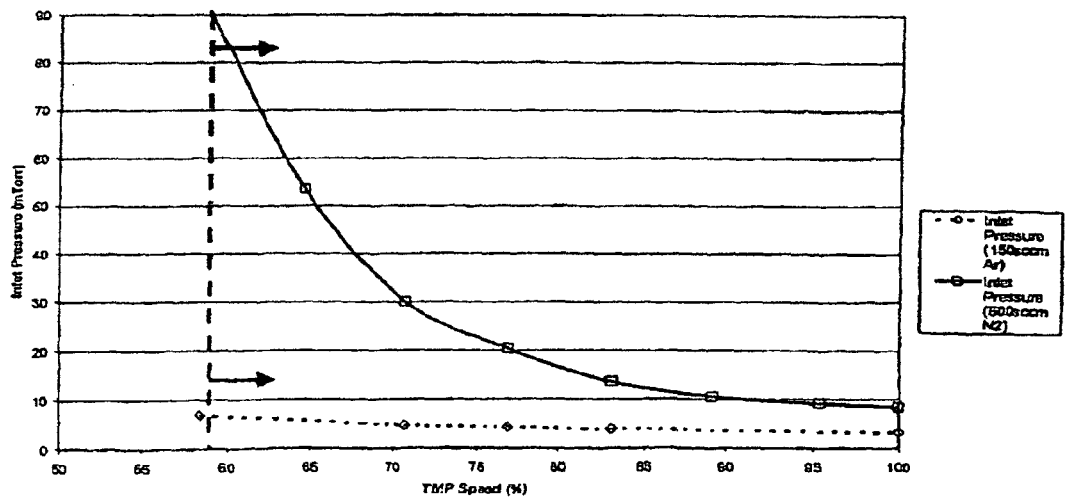
FIG. 6 is a graph of inlet pressure against pump speed.

It has been found that turbo molecular pumps, especially in combination with molecular drag pumps, produce chamber pressures well below that required to meet the relationship shown in FIG. 5. FIG. 6 shows the relationship between speed of a TMP and inlet, or chamber, pressure. FIG. 6 shows this relationship for a mass flow rate of Ar at 150 sccm which requires a chamber pressure of 9 mtorr and a mass flow rate of $N_2$ at 500 sccm which requires a chamber pressure of 90 mtorr. At 500 sccm of $N_2$, the chamber pressure achieved while operating the pump at 100% speed is about 8 mtorr.

Therefore, the speed can be reduced and as shown it is not until about 58% before the required chamber pressure of 90 mtorr is exceeded. For 150 sccm of Ar, a speed of 58% is still able to achieve pressures below the required pressure of 9 mtorr. Accordingly, it will be appreciated that pump speed can be reduced whilst still achieving required chamber pressure.

Figure 7:
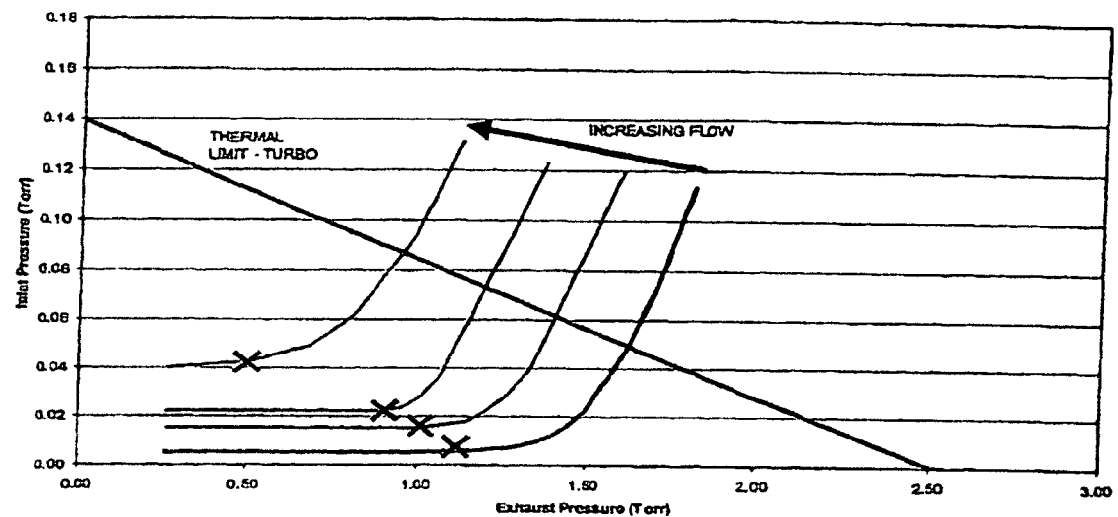
FIG. 7 is a graph of inlet pressure against exhaust pressure for a first pump unit.
Figure 8:
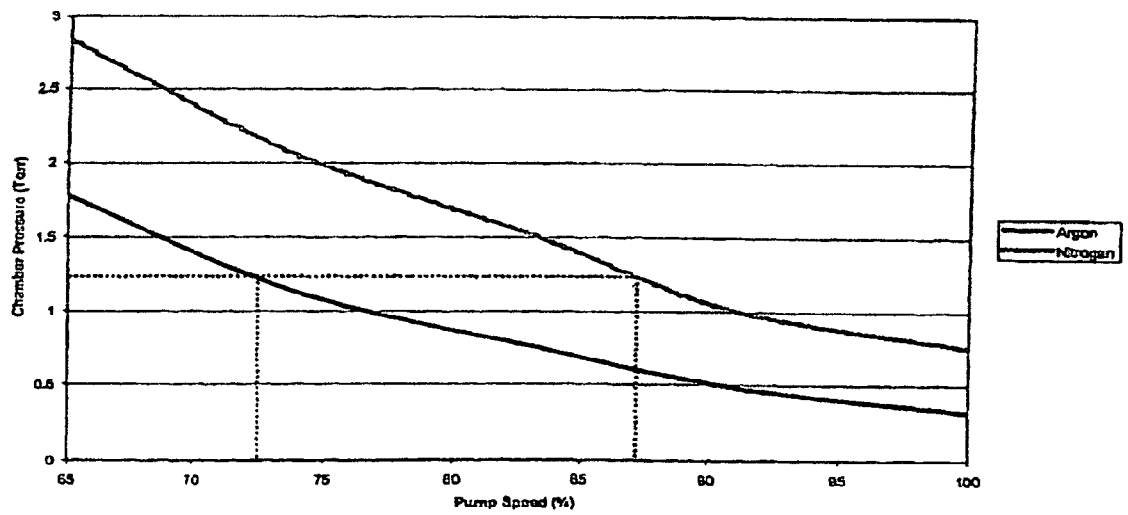
FIG. 8 is a graph of chamber, or inlet, pressure against pump speed showing motor stall speeds.

FIG. 7 shows the same relationship as FIG. 4 between exhaust pressure and inlet pressure, but in FIG. 7 the pump speed is controlled to increase the range of chamber pressures over which change in exhaust pressure produces changes in chamber pressure without exceeding the thermal limit of the TMP. As shown in FIG. 7, the thermal limit has been increased so that control of chamber pressure is possible without exceeding that limit. In other words, the critical backing pressures, above which change in exhaust pressure affects chamber pressure, fall usefully below the exhaust pressure at which the thermal limit is exceeded. Accordingly, when the speed of the pump is limited to a predetermined level, this increases the range of pressures above the critical backing pressure and below a pressure at which thermal limit is exceeded but still allows a required chamber pressure to be achieved for a given process gas at a given flow rate. Pump speed can be limited to 90%, 80% or 70% as required or 66% as in the example above. In addition to the problems described above concerning the thermal limit of the pump, there is a further problem concerning the stall speed of the pump. This latter problem becomes particularly acute when relatively high chamber pressures are required, for instance pressures above 0.5 Torr. The problem occurs because high inlet pressures can cause the pump motor to stall. However, as shown in FIG. 8, reducing the speed of the pump alleviates this problem allowing relatively high chamber pressures to be achieved without the pump stalling. FIG. 8 shows characteristics of a TMP as a function of pump speed and chamber pressure for a relatively light gas such as $N_2$ and a relatively heavy gas such as Ar. The pump stalls when operating in the area above the curves for each gas. As will be seen from the graph, reducing the speed of the pump increases the chamber pressures possible prior to stalling. For instance, a required chamber pressure of about 1.25 Torr for $N_2$ can be achieved when the pump speed is reduced below about 87%. The same required chamber pressure of 1.25 Torr for Ar can be achieved when the pump speed is reduced below about 73%. Therefore, reducing the pump speed increases the upper limit possible for chamber pressure without the pump stalling.

Combining the findings of FIGS. 7 and 8, it will be appreciated that a reduction in pump speed increases the range of chamber pressures that are obtainable between a limit restricted by thermal behaviour of the pump and a limit at which stalling occurs.

In addition to the problems described above, there exists a further problem in that the valve for controlling exhaust pressure is too sensitive, control thereof effecting a change chamber pressure over a relatively small range. The flow control unit 18 in FIG. 1 comprises a variable flow control device as described above and a further flow control device, which in one embodiment described hereinafter is a fixed restricted orifice and in a further embodiment is a second variable flow control device. However, before describing in more detail the effect of the further flow control device, it is useful for the purposes of understanding and comparison, to describe a flow control unit including only a first variable flow control device but omitting the further flow control device. Such a latter flow control unit is now described with reference to FIGS. 3 and 9 to 11.

Controlling the variable flow control device 20 so that flow is reduced (i.e. reducing conductance of the flow control unit), increases the backing pressure of the first pump unit 14. Increasing conductance of the flow control unit reduces backing pressure. However, the relationship between conductance of the variable flow control device and valve angle of the device is not linear.

Figure 9:
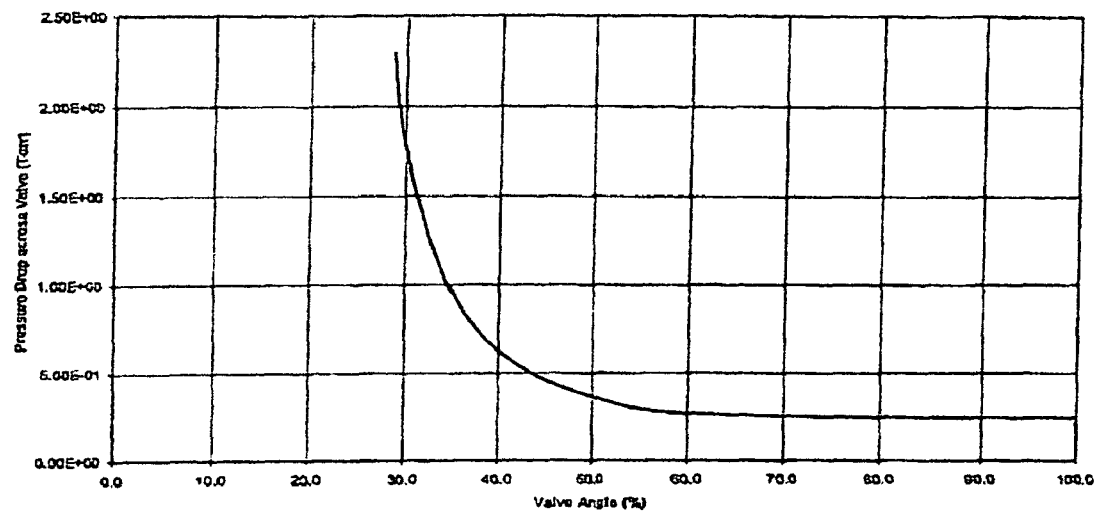
FIG. 9 is a graph showing pressure drop across a variable flow control device against valve angle of the device.

FIG. 9 plots the relationship between pressure drop across the valve 20 and valve angle. The following relationship applies:

Conductance=mass flow rate/pressure drop

Therefore, conductance is inversely proportional to pressure drop. The valve angle is expressed as a percentage where 100% signifies that the valve is fully open and 0% signifies that the valve is fully closed. FIG. 9 shows the relationship for a constant mass flow rate of 200 sccm. It will be seen from FIG. 9 that closing the valve from a fully open position achieves relatively little change in pressure drop over a range from 100% to about 60%. Further closing achieves an increasing change in pressure drop as will be seen by the steep curve over the valve angle range from about 40% to about 27%.

The critical backing pressure occurs at a relatively steep portion of the curve shown in FIG. 9 where exhaust pressure is changing relatively quickly. Therefore, changes in valve angle above the critical backing pressure produce rapid changes in chamber pressure as shown in FIG. 3 referred to above. A change in chamber pressure from 0.02 to 0.2 Torr is effected by a change in valve angle of only about 2%. It will be appreciated therefore that only a relatively small change in valve angle produces a relatively large change in chamber pressure, meaning that precise control of the valve is required. Different pumps may have different critical backing pressures.

Figure 10:
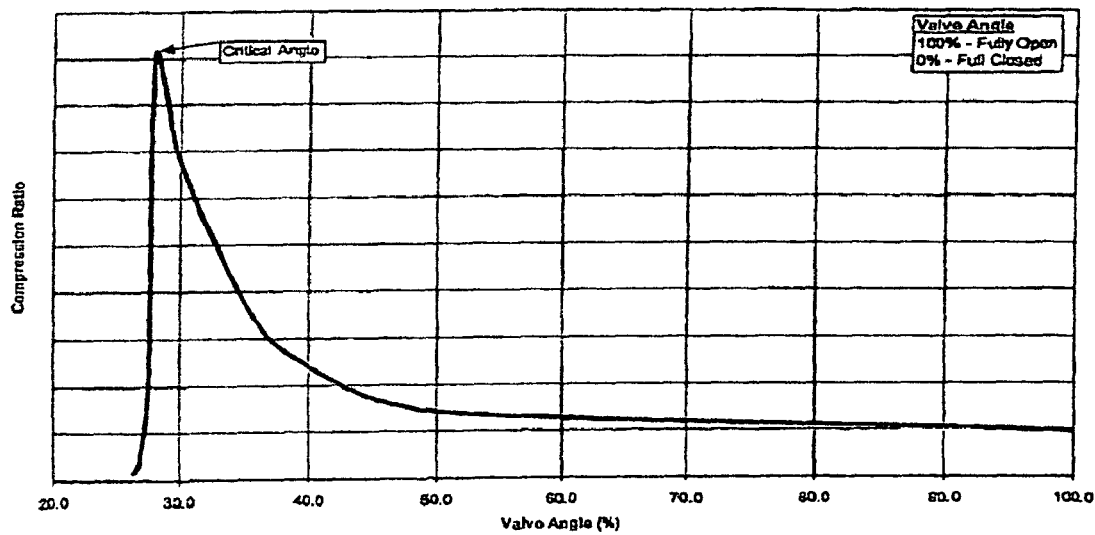
FIG. 10 is a graph of compression ratio of a first pump unit against valve angle of a variable flow control device.

FIG. 10 is a graph which illustrates the relationship between valve angle of the variable flow control device and compression ratio of the first pump unit 14. The compression ratio of the first pump unit 14 is equal to the pressure at the outlet of the first pump unit, or backing pressure, (FIG. 9) divided by the pressure at the inlet of the first pump unit (i.e. chamber pressure as shown in FIG. 3). As will be seen, closing the valve from a fully open condition, produces a relatively shallow increase in the compression ratio which increases until the critical backing pressure is reached at 29% valve angle. This portion of the curve is determined by the curve of FIG. 9. Closing of the valve from the critical backing pressure produces a sharp increase in the inlet pressure of the first pump unit 14 and therefore a sharp decrease in compression ratio. This portion of the graph is determined by the curves in both FIGS. 3 and 9. The valve should not be fully closed when the pump is operating since this would damage the pump. The critical angle of the valve, as illustrated, occurs at the critical backing pressure of the first pump unit 14.

Figure 11:
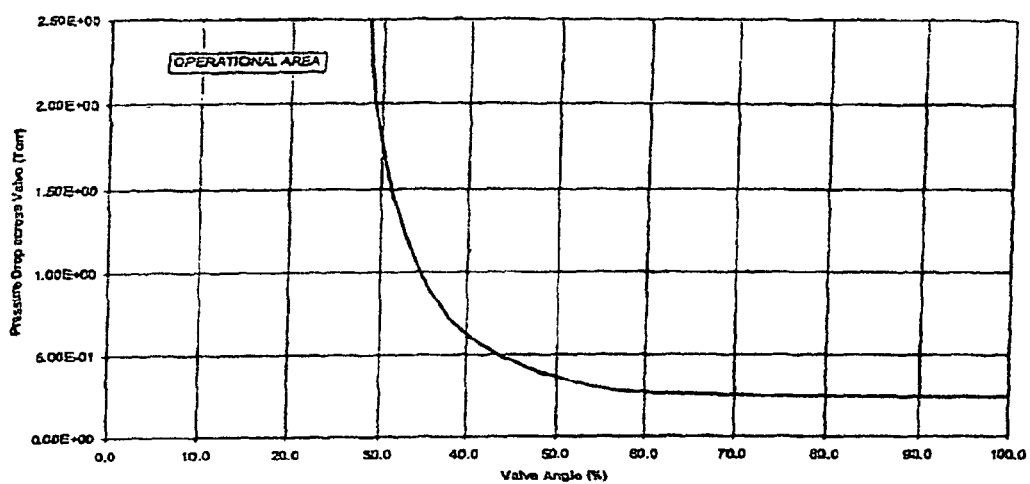
FIG. 11 is a graph of pressure drop across a variable flow control device against valve angle of the device also showing an operational range.
Figure 12:
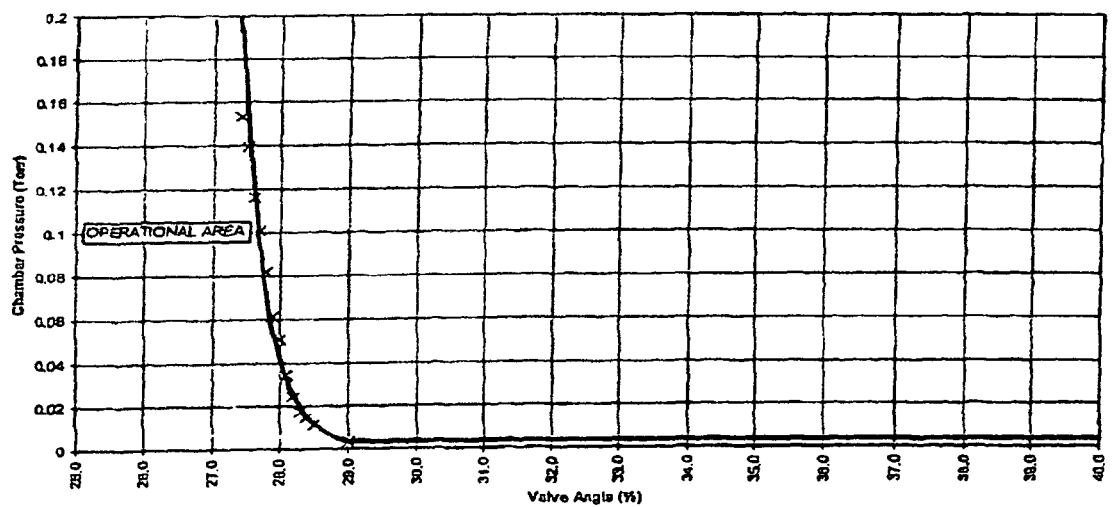
FIG. 12 is a graph of chamber pressure against valve angle also showing an operational range.

An operational range of chamber pressure is shown in FIG. 11 by the shaded area. To achieve this chamber pressure operational range, the variable flow control device 18 must be capable of varying pressure drop in the operational range above the critical backing pressure for the pump for a selected process gas and flow rate. This range of pressure drop values is achieved at the relatively steep portion of the curve where the critical angle occurs and therefore the operational range of control of the variable flow control device is between a valve angle of about 27% and 29%.

Figure 13:
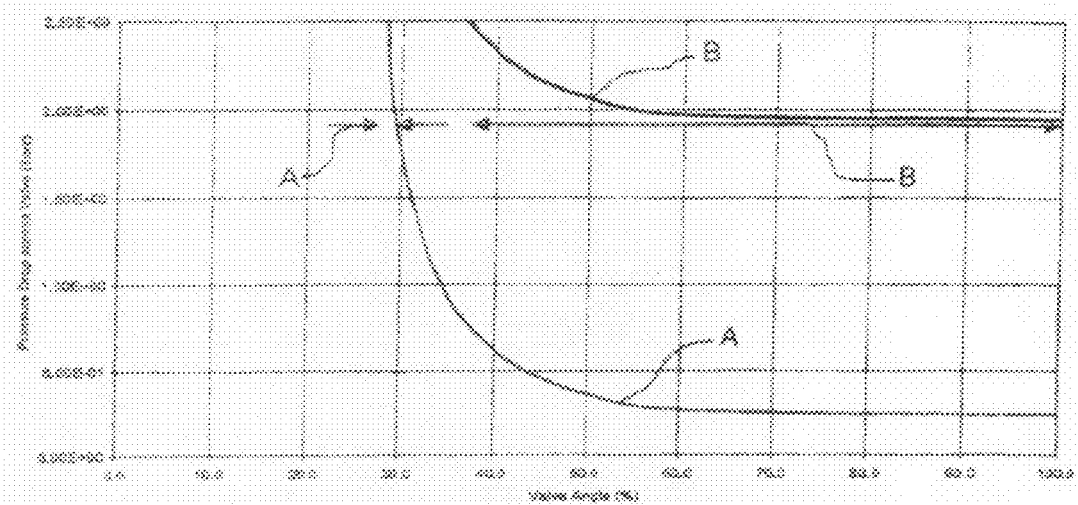
FIG. 13 is a graph of pressure drop across a variable flow control device against valve angle also showing an operational range and comparing the performance of a prior art arrangement against an arrangement embodying the invention.

The embodiments described further hereinafter increase the operative range of the variable flow control device 20 which is effective in producing a change in chamber pressure. This is achieved by decreasing the total, or overall, conductance of the flow control unit 18 so that the operational range occurs in the flatter part of the valve pressure drop curve. The conductance is decreased by providing the flow control unit 18 with a further flow control device of predetermined or variable conductance. As shown in FIG. 13, curve B has been shifted by an increase of about 1.6 Torr (i.e. decreasing conductance) so that when the valve is fully open it is already in its operative range and any closing of the valve effects a change in chamber pressure. This is not the case with curve A, which is the curve for a flow control unit in which the further flow control device is omitted, and which does not enter the operational range until a relatively steep portion of the curve when the valve angle is about 29%.

It will be appreciated that the range of valve angles for curve B between about 100% and about 40% (see arrows referenced B) effects changes in chamber pressure and therefore control of the variable flow control device can be less sensitive than the case with curve A (see arrows referenced A).

It is preferable that the conductance of the further flow control device is such that when the variable flow control device is fully open, the first pump unit is close to, and preferably at, its critical backing pressure. With this arrangement, any closing of the variable flow device from the fully open condition effects a change in chamber pressure.

Figure 14:
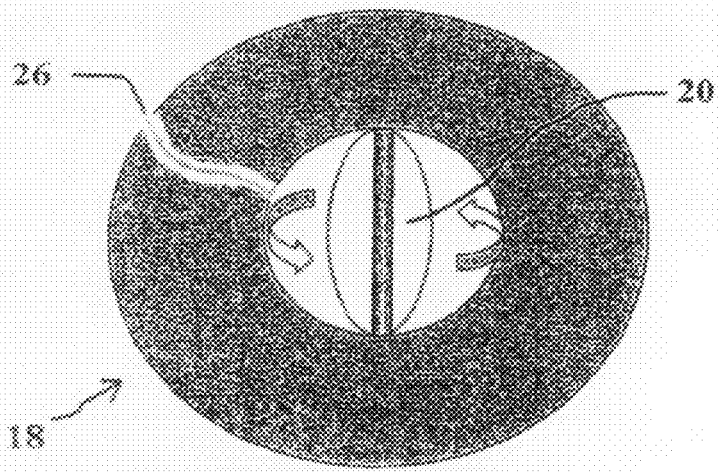
FIG. 14 is schematic view of a flow control unit in accordance with one embodiment.

Referring to FIG. 14, the further flow control device is shown in the form of a fixed restricted orifice 26 for decreasing the conductance of the flow control unit 18. The variable flow control device, butterfly valve 20, is provided parallel to and radially inwardly of the restricted orifice 26. From a comparison of FIG. 14 with FIG. 2, it will be appreciated that there is greater resistance to flow when the butterfly valve is fully open in FIG. 14 than in FIG. 2. The sizing of the orifice 26 is selected according to the characteristics of the first pump unit 14 and in particular to its critical backing pressure. In other words, the conductance of the further flow control device is chosen so that the variable flow control device is effective in controlling chamber pressure over the flat part of the curve as shown in FIG. 13. Preferably, the conductance of the further flow control device is chosen so that when the variable flow control device is fully open, closing of the valve effects change in the chamber pressure.

Figure 18A:
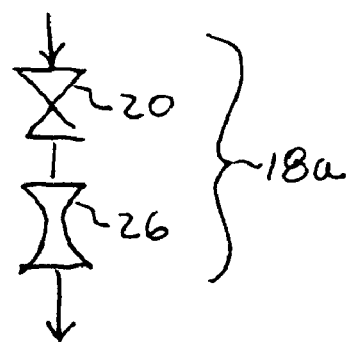
FIGS. 18A and 18B show embodiments of flow control units according to the invention.
Figure 18B:
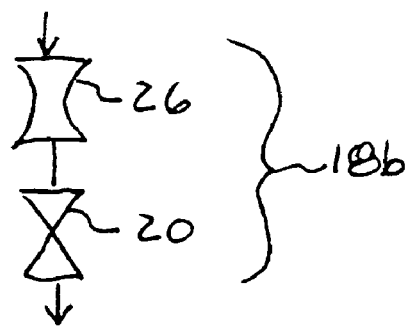

FIG. 14 illustrates one possible form of the further flow control device having a fixed conductance. However, other forms are possible and may be preferred in certain situations. For instance, a plate restriction or ball valve may be adopted. The duct cross-section between the first pump unit 14 and the second pump unit 16 can be sized to restrict flow as desired. The further flow control device is preferably in series with the variable flow device and may be either upstream or downstream thereof. Specifically, the variable flow device may be upstream of the further flow control device, as illustrated by the flow control unit 18a of FIG. 18A, or the variable flow device may be downstream of the further flow control device, as illustrated by the flow control unit 18b of FIG. 18B.

Figure 15:
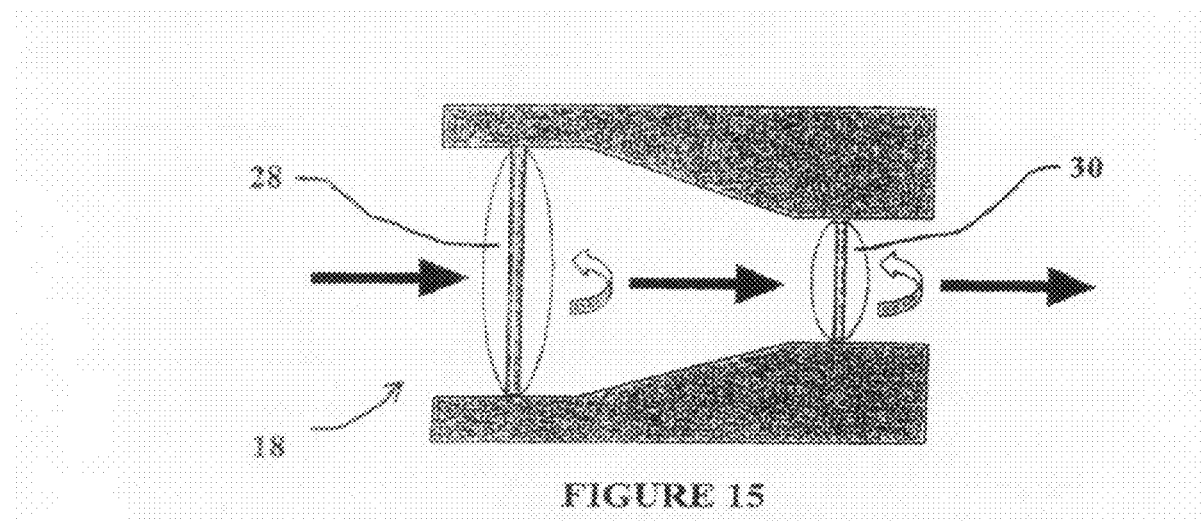
FIG. 15 is schematic view of a flow control unit in accordance with a second embodiment.

An alternative arrangement of the flow control unit is shown in FIG. 15, in which two variable flow control devices are provided in series. The variable flow control device as shown consists of a first butterfly valve 28 and the further flow device as shown consists of a second butterfly valve 30. The first butterfly valve is for making fine adjustments to chamber pressure and the second butterfly valve is for making relatively larger adjustments to chamber pressure.

Figure 16:
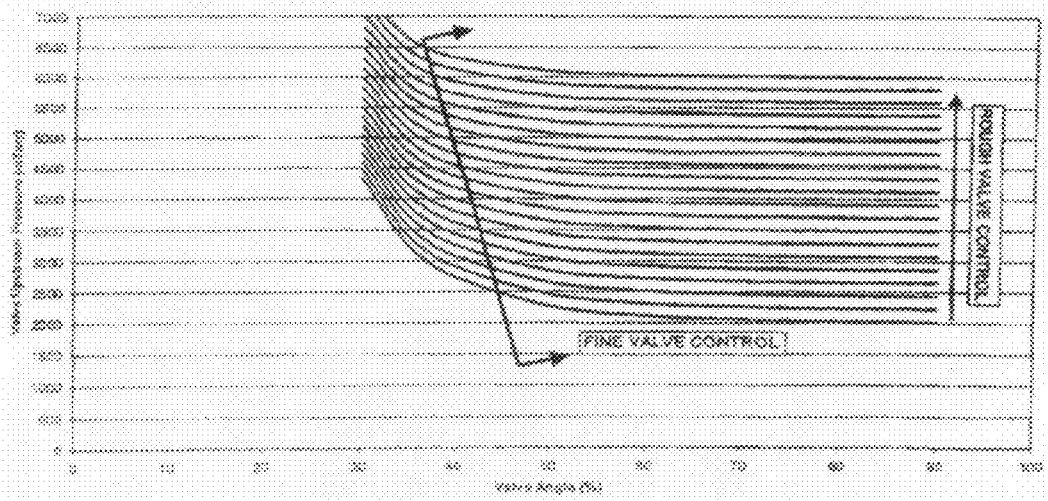
FIG. 16 is a graph of valve angle against backing pressure for the second embodiment.

FIG. 16 illustrates operation of the flow control unit 18 of FIG. 15. In FIG. 16, the valve angle of the first butterfly valve 28 is plotted against the valve upstream pressure, or backing pressure of the first pump unit 14. For each curve on the graph, the valve angle, and therefore the conductance, of the second butterfly valve is fixed. The conductance of the second butterfly valve is therefore selected so that the variable flow control device is effective in controlling chamber pressure over the flat part of the curve and preferably is chosen so that when the variable flow control device is fully open, closing of the valve effects change in the chamber pressure. Variation in the valve angle of the first butterfly valve controls the backing pressure along each curve and hence chamber pressure. The advantage of this structure is that the flow control device is suitable for operation with any one of a plurality of different pumps of various different critical backing pressures. The conductance of the second butterfly is selected according to the characteristics of the first pump unit 14 and then in operation the first butterfly valve is controlled to control pressure in the process chamber.

A chamber pressure control method and apparatus according to the present invention have been implemented on an aluminium etch tool and comparisons of the performance of this improved system have been made with that of a conventional inlet throttle valve. The tool used for these comparisons was a 200 mm LAM TCP9600SE stand alone metal etch tool. Significant improvements in semiconductor wafer quality have been experienced over an eight month test period.

Firstly, a significant reduction (38%) in the number of particles (with a diameter greater than 0.2 (m) deposited on each wafer can be seen when compared to the conventional system. This reduction in particle population directly correlates to a reduction in the number of defects experienced per metal layer. Defects being where such large particles interfere with the wafer geometry such that short circuits and the like are formed. This reduction in defects is approximately 30% when compared to the conventional apparatus.

Since the number of these defects has reduced an overall improvement in productivity can be seen. The estimated improvement in overall yield for a five layer metal device is approximately 1.5% over the conventional apparatus.

Furthermore, the reduced level of particulate deposits in the operating chamber causes the mean time between one shut down for maintenance and the next to be extended. In other words, the duration of operating periods can be increased since cleaning operations can be scheduled less frequently, leading to further improvements in productivity levels.

Improvements have also been found in the definition of the etch trench geometry such that the quality of the product is further enhanced over items produced using a conventional apparatus.

The invention claimed is:

1. A method for controlling the pressure in a process chamber wherein a first pump unit having an inlet is in fluid connection with an outlet of said process chamber, and a second pump unit having an inlet is in fluid connection with an outlet of the first pump unit via a flow control unit comprising:
controlling outlet flow pressure at the outlet of the first pump unit; and
controlling speed of the first pump unit below a predetermined value to increase an operable range of chamber pressures over which control of the outlet fluid pressure produces changes in said chamber pressure, wherein the range does not exceed a limit selected from the group consisting of thermal limit and motor stall limit of the first pump unit.

2. The method as claimed in claim 1 further comprising limiting the speed of the first pump unit to a predetermined level which enables a required chamber pressure to be achieved and which increases the range of outlet fluid pressure above a critical pressure and below a pressure at which the thermal limit of the first pump unit is exceeded.

3. The method as claimed in claim 1, further comprising reducing the speed of the first pump unit thereby increasing the outlet fluid pressure to achieve relatively high chamber pressures.

4. The method as claimed in claim 1, further comprising selecting speed of the first pump unit by using at least one relationship selected from the group consisting of inlet pressure of the first pump unit is a function of fluid mass flow rate, the speed, and fluid molecular mass; thermal level of the first pump unit is a function of fluid mass flow rate, the speed, exhaust pressure of the first pump unit, inlet pressure of the first pump unit, and thermal conductivity of the fluid; and stall speed of the first pump unit is a function of inlet pressure of the first pump unit, and fluid molecular mass.

5. The method as claimed in claim 4 wherein the selected speed is maintained such that the inlet pressure is less than a required inlet pressure for the first pump unit; the thermal level is less than the thermal limit of the first pump unit; and the speed is less than the stall speed.

6. The method as claimed in claim 1, further comprising decreasing the conductance of the flow control unit thereby increasing the operative range over which control of a variable flow control device within the flow control unit effects changes in the pressure in said process chamber.

7. The method as claimed in claim 6, further comprising decreasing the conductance of a further variable flow control device within the flow control unit to increase the operative range over which control of the variable flow control device effects changes in the pressure in such a process chamber.

8. An apparatus for controlling the pressure in a process chamber comprising:
a first pump unit having an inlet for fluid connection with an outlet of said process chamber,
a second pump unit having an inlet for fluid connection with an outlet of the first pump unit via a flow control unit, the flow control unit comprising a variable flow control device having variable conductance for controlling fluid pressure at the outlet of the first pump unit, and
means for controlling speed of the first pump unit below a predetermined value to increase an operable range of chamber pressures over which control of the variable flow control device produces changes in said chamber pressure, wherein the range does not exceed a limit selected from the group consisting of a thermal limit and a motor stall limit of the first pump unit, wherein the means is electrically connected to the first pump unit.

9. The apparatus as claimed in claim 8, wherein the variable flow control device is a butterfly valve.

10. The apparatus as claimed in claim 8 wherein the first pump unit comprises a turbo-molecular pump and the second pump unit comprises a backing pump.

11. The apparatus as claimed in claim 8 wherein the first pump unit comprises two pumps in series.

12. The apparatus as claimed in claim 8 wherein the flow control unit is relatively close to the exhaust of the first pumping unit so that chamber pressure responds quickly to control of the flow control unit.

13. The apparatus according to claim 8 wherein the means for controlling speed is a controller for regulating speed at a selected, predetermined, constant level.

14. The apparatus as claimed in claim 7 wherein the second pump unit comprises two pumps in series.

15. An apparatus for controlling the pressure in a process chamber comprising: a first pump unit having an inlet for fluid connection with an outlet of said process chamber, a second pump unit having an inlet for fluid connection with an outlet of the first pump unit via a flow control unit, the flow control unit comprising a variable flow control device having variable conductance for controlling fluid pressure at the outlet of the first pump unit, and means for controlling speed of the first pump unit to increase the range of chamber pressures over which control of the variable flow control device produces changes in said chamber pressure not exceeding a limit selected from the group consisting of a thermal limit and a motor stall limit of the first pump unit, wherein the flow control unit comprises a further flow control device for decreasing the total conductance of the flow control unit thereby increasing the operative range over which control of the variable flow control device effects changes in the pressure in the process chamber.

16. The apparatus as claimed in claim 15, wherein the conductance of the further flow control device is selected so that when the variable flow control device is fully open, the backing pressure of the first pump unit is relatively close to or above critical backing pressure.

17. The apparatus as claimed in claim 15, wherein the variable flow control device is in series with the further flow control device in the flow control unit.

18. The apparatus as claimed in claim 17, wherein the variable flow control device is downstream of the further flow control device.

19. The apparatus as claimed in claim 17, wherein the variable flow control device is upstream of the further flow control device.

20. The apparatus as claimed in claim 17, wherein the further flow control device is a butterfly valve.

21. The apparatus as claimed in claim 15 wherein the variable flow control device is parallel with the further flow control device.

22. The apparatus as claimed in claim 15 wherein the further flow control device has variable conductance which can be selected depending on the critical backing pressure of any one of a plurality of different first pump units.

23. The apparatus as claimed in claim 22, wherein the further flow control device is a second variable flow control device.

24. The apparatus as claimed in claim 15, wherein the further flow control device is a restriction in the duct between the first pump unit and the second pump unit.

25. The apparatus as claimed in claim 15 wherein the further flow control device is a plate or fixed orifice restriction.

26. The apparatus as claimed in claim 15 wherein the further flow control device is a ball valve or pendulum valve.

27. The apparatus as claimed in claim 15 wherein the operative range effects changes in the pressure in the process chamber from a generally fully open condition of the variable flow control device.

* * * * *